June 18, 1929.　　A. M. MERTZANOFF　　1,717,993
MEANS FOR CONTROLLING THE RATE OF COMBUSTION IN HEATING APPARATUS
Filed March 10, 1924　　2 Sheets-Sheet 2
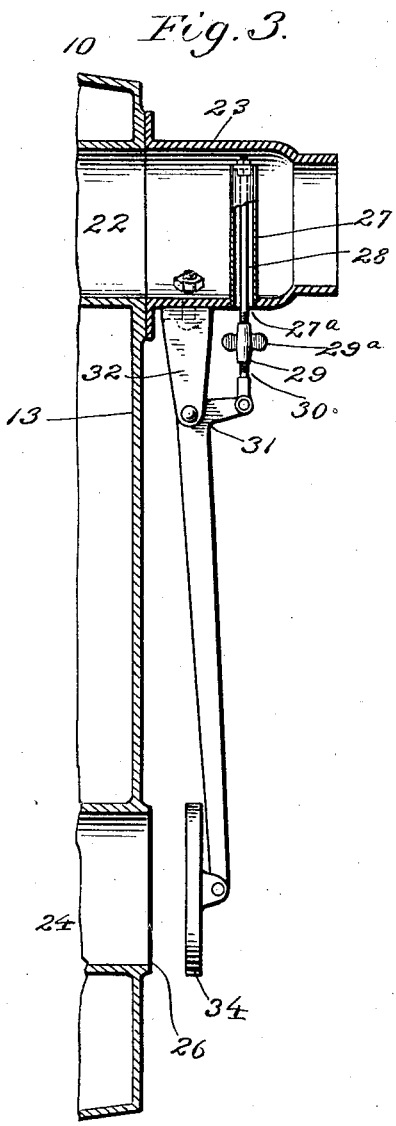
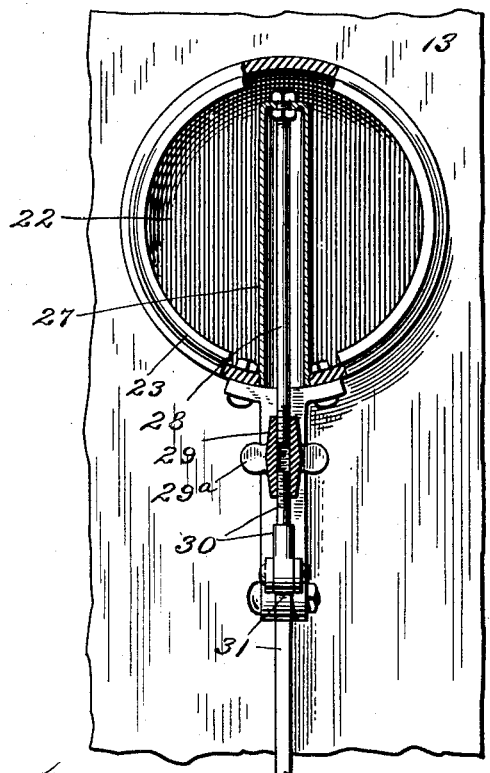
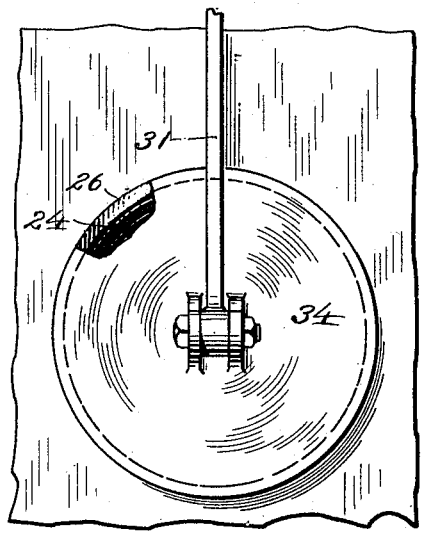

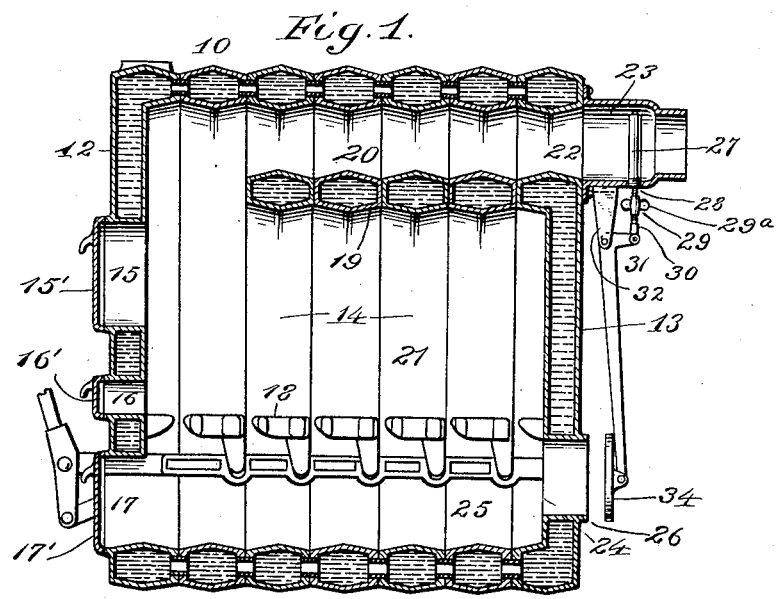

Patented June 18, 1929.

1,717,993

UNITED STATES PATENT OFFICE.

ANDRÉ M. MERTZANOFF, OF NEW YORK, N. Y., ASSIGNOR TO AMERICAN RADIATOR COMPANY, OF NEW YORK, N. Y., A CORPORATION OF NEW JERSEY.

MEANS FOR CONTROLLING THE RATE OF COMBUSTION IN HEATING APPARATUS.

Application filed March 10, 1924. Serial No. 698,064.

My invention relates to improvements in heating apparatus, and the same has for its object more particularly to provide a simple, efficient and positive regulating device for controlling the operation of steam and hot water boilers, hot air furnaces, and other types of heating apparatus.

Further, said invention has for its object to provide a regulating device for heating apparatus whereby a uniform production of heat at any desired predetermined temperature may be maintained in said heating apparatus.

Further, said invention has for its object to provide a regulating device for a heating apparatus whereby the rate of combustion of the fuel consumed therein may be definitely and accurately controlled.

Further, said invention has for its object to provide a device whereby the rate of combustion of the fuel in a heating apparatus may be definitely and accurately controlled by the temperature of the hot gases and products of combustion liberated or produced by the fuel.

Further, said invention has for its object to provide a regulating device for a heating apparatus whereby the rate of combustion is controlled wholly by the action of the flue gases or products of combustion upon means, located directly in the path of travel of said gases or products of combustion, and operatively associated with the means for supplying the air necessary to support the combustion of the fuel.

Further, said invention has for its object to provide a regulating device whereby the combustion of the fuel may be maintained at a rate which will prevent the destruction of the heating apparatus, or injury to any of its parts or surfaces, whether the same be water-backed or not.

Further, said invention has for its object to provide a regulating device for a heating apparatus whereby the rate of combustion of the fuel, and the resultant heat emitted by said apparatus may be definitely and accurately controlled by thermonsensitive means located in the outlet of the heating apparatus and operatively associated with the air inlet for supplying air necessary to support combustion, and subjected directly to the temperature variations of the stack gases or products of combustion.

Other objects will in part be obvious and in part be pointed out hereinafter.

To the attainment of the aforesaid objects and ends my invention consists in the novel features of construction, and in the combination, connection and arrangement of parts hereinafter more fully described and then pointed out in the claims.

In the accompanying drawings, forming part of this specification—

Figure 1 is a central longitudinal sectional view of a boiler equipped with one form of regulating device constructed according to, and embodying my said invention;

Fig. 2 is a back view of the same;

Fig. 3 is an enlarged detail side elevation, partly in section, illustrating the construction of controlling device, and Fig. 4 is a face or front view thereof.

In said drawings 10 designates a boiler which, for the purposes of illustration, is shown as a a hot water boiler of the sectional type, comprising end sections 12, 13, and a plurality of intermediate sections 14. The boiler is provided in its front section 12 with the usual fuel opening 15, slicing opening 16, and ashpit opening 17, having doors 15′, 16′, 17′, respectively. Within the boiler is provided a grate 18, and above said grate a horizontal partition 19 extending forwardly toward the front section 12, to form a horizontal flue 20 extending from the combustion chamber 21 to a smoke outlet 22 provided in the back section 13. 23 denotes a collar secured upon the outer side of the back section 13 in position registering with the smoke outlet 22.

24 denotes an air inlet arranged in the back section 13 and communicating with the ashpit 25 of the boiler for the admission to the boiler of the air necessary to support the combustion of the fuel. The said air inlet 24 is provided with a collar 26 upon the outer side of the back section 13 in line with said air inlet opening 24.

Within the collar 23, secured over the smoke outlet 22, is disposed a thermostatic device which may be of any suitable form, and is herein shown as comprising a tubular protecting member or casing 27 which is closed at its upper end, and suitably secured at its lower end within an opening provided in the collar 23. The said tubular member or casing 27 has its wall portion preferably made thin in order to communicate readily to the interior of said tubular member or casing, any temperature changes occurring within the collar or smoke outlet. Within said tubular member or casing 27 is disposed a rod 28 having its upper end fixedly secured to the upper end of said member or casing 27, and its lower end extending freely through an opening 27ª provided in the lower end of said member or casing 27.

The rod 28 is made of a metal which is readily responsive to temperature changes which will cause the said rod to increase or decrease in length in accordance with the temperature of the hot gases and products of combustion passing through said outlet to the stack.

The lower end of the rod 28 is screw-threaded to receive one end of a threaded member or turnbuckle 29 whose other end is adapted to receive the threaded end of a link 30 pivotally secured to the short upper end or arm of a bell-crank lever 31 which is pivotally supported upon a bracket 32 secured to the underside of the collar 23 secured over the outlet 22. The threaded member or turnbuckle 29 may be provided with wings or finger portions 29ª to permit of the rotating thereof in order to increase or decrease the length of the parts between the rigid or fixed end of the rod 28 and link 30 connected to the short end of the bell crank lever 31.

By adjusting the threaded member or turnbuckle 29 the combined length of the rod 28 and link 30 may be increased or decreased whereby the travel of the plate or disk 34 of the air inlet communicating with the ash pit may correspondingly be varied in order to cause said plate or disk to close said inlet when the fire reaches or approximately reaches a given temperature.

To the lower end of the long member or arm of said bell crank lever 31 is secured a circular plate or disk 34 forming a damper or closure adapted to seat against the outer edge of the collar 26 surrounding the air inlet 24. The outer edge of said collar 26 and the face of the plate or closure 34 are ground to form a relatively tight joint when said parts are forced into engagement under the influence of the thermo-sensitive device 28 and the interposed lever 30.

I have found that the rate of combustion of the fuel in a boiler is a direct function of the temperature of stack gases, i. e. of the hot gases and products of combustion produced or liberated by the fuel, and that the rate of combustion of the fuel, and the resultant temperature may be positively and accurately controlled by utilizing the heat of said stack gases to actuate thermo-sensitive means operatively associated with a damper or closure controlling the admission to the boiler of the air to support combustion, at a point below the grate. I, further, have found that by locating a thermo-sensitive device in the smoke outlet of the boiler, at a point close to where the hot gases and products leave the boiler, and exposing said device to the direct action of said hot gases and products of combustion, any undue rise or drop in temperature which is, of course, immediately manifested in the fuel receptacle and combustion chamber is instantly reflected in the temperature of the hot gases and products of combustion leaving the boiler through the smoke outlet. It will, therefore, be obvious that by exposing a thermo-sensitive device, operatively associated with the cold air supply control, to the direct action of said hot gases and products of combustion the thermo-sensitive element of said device will be immediately affected by the temperature changes in said gases and expand or contract in response to such changes. The resultant change of shape or size of said thermo-sensitive element will cause the closure or damper controlling the cold air inlet of the boiler to open or close and by limiting or increasing the supply of cold air control the rate of combustion of the fuel and the temperature of the fire in a predetermined manner.

Such immediate response of the closure controlling the cold air supply cannot be obtained, and within so small a range of temperatures, where the thermo-sensitive device is indirectly responsive to the temperature variations of a heating medium in a boiler, such as hot water or steam. Where the thermo-sensitive device is indirectly operated as above specified a considerable loss of time and waste of fuel results because any rise or drop in the temperature of the fire must first be communicated to and be absorbed by the heat emitting medium—the hot water or steam—and then transmitted thereby to the thermo-sensitive element of said device before the same becomes responsive to actuate the damper. It therefore follows that unless the thermo-sensitive device can be rendered immediately responsive to control the closure for the cold air inlet the fire will be caused to assume a much higher or lower temperature, and continue to burn at such increased or decreased rate of combustion for a much greater length of time than is necessary after the desired or predetermined temperature of the room has been attained or restored.

By arranging the thermo-sensitive device in the stack or pipe leading from the smoke outlet, and locating said device closely adjacent to said smoke outlet, the hot gases and products of combustion will act directly upon said device and cause the same immediately to vary the position of the closure of the cold air inlet. A change of a few degrees in temperature is sufficient to cause said thermo-sensitive device to become responsive and actuate said air inlet closure.

It is to be noted further, that instead of making the rod 28 of thermo-sensitive material and the surrounding casing 27 therefor of less thermo-sensitive material, I may reverse the parts and make the casing 27 of thermo-sensitive material and the rod 28 of material less thermo-sensitive, and arrange the remaining parts of the device accordingly.

It is to be noted that while I have shown one form of thermo-sensitive device for actuating the plate or disk controlling the admission of air to the ashpit, I do not wish to be limited thereto, as different forms of devices may be employed, and that the same may or may not be protected by an enclosing casing, depending upon the construction of the specific device employed.

Having thus described my said invention, what I claim and desire to secure by Letters Patent is—

1. The combination of a boiler or analogous heating apparatus having an air inlet at its base communicating with the ash pit, and an outlet for the products of combustion arranged above said air inlet with a collar secured about said outlet, a thermo-sensitive device disposed within said collar comprising a rigid tubular portion secured at one end to said collar and having its other end closed and extending across the interior of said collar, and a movable portion disposed within said tubular portion and secured at one end to the closed end thereof, a support secured to said collar adjacent to the open end of said tubular portion, a lever pivotally mounted in said support and pivotally secured at one end to the outer end of the movable portion of said thermo-sensitive device, and the other end of said lever carrying a closure for controlling the passage of air through said air inlet, substantially as specified.

2. The combination of a boiler or analogous heating apparatus having an air inlet at its base communicating with the ash pit, and an outlet for the products of combustion arranged above said air inlet with a collar secured about said outlet, a thermo-sensitive device secured to said collar; said thermo-sensitive device comprising a tubular protecting portion open at one end and closed at its other end and having its open end secured to said collar and its closed end extending across the passage in said collar, an expansible-contractible member disposed within said tubular portion having its inner end secured to the closed end of said tubular portion and its outer end extending beyond the open end of said tubular portion, a support secured to said collar adjacent to the open end of said tubular portion, a bell-crank lever mounted in said support, a link pivotally secured to one arm of said bell-crank lever, an adjustable connection uniting said link with the outer end of said expansible-contractible member, and a closure secured to the other arm of said bell-crank lever for controlling the passage of air through said air inlet, substantially as specified.

Signed at the city of New York, in the county and State of New York, this 16th day of May, one thousand nine hundred and twenty-three.

ANDRÉ M. MERTZANOFF.